United States Patent Office 3,598,652
Patented Aug. 10, 1971

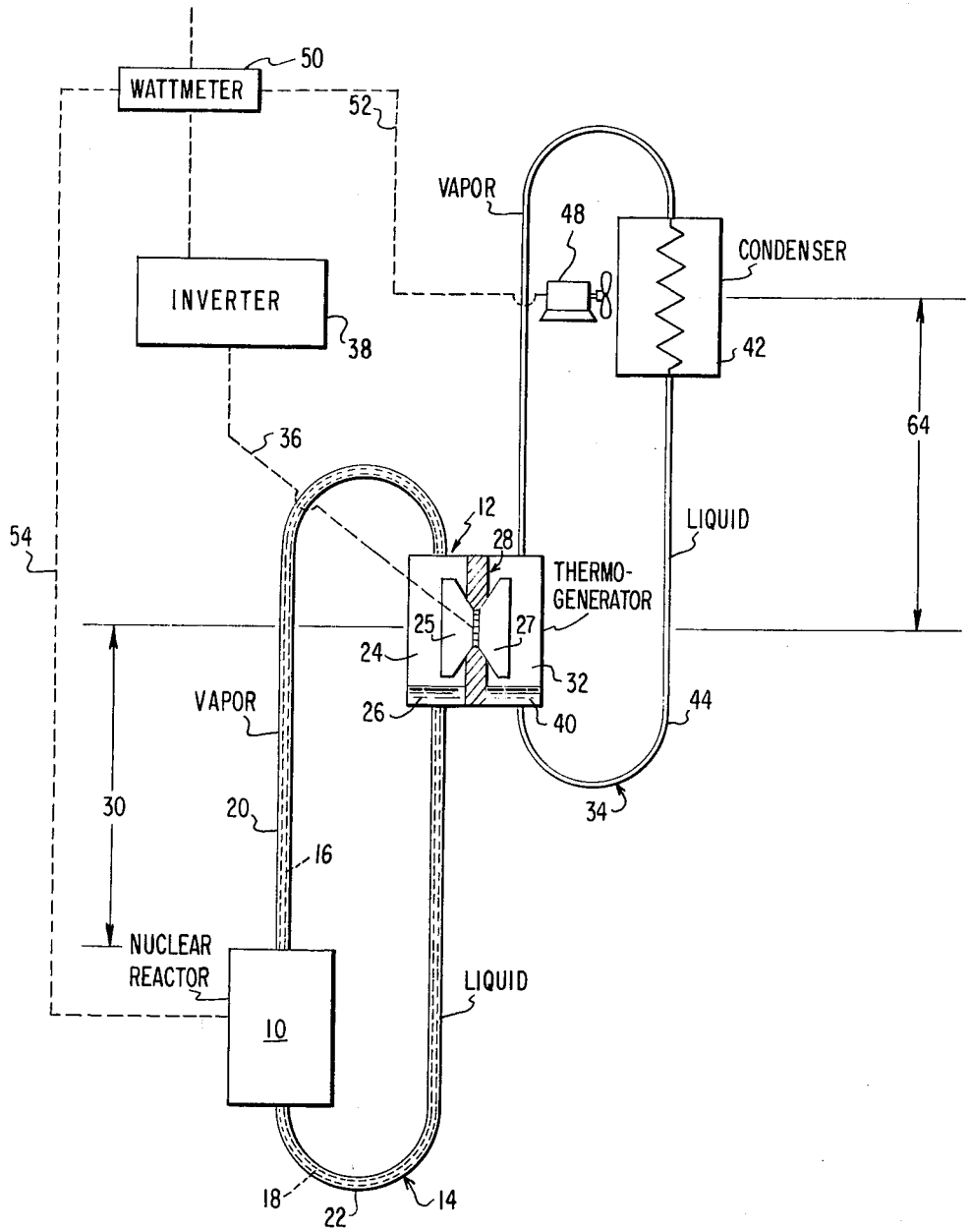

3,598,652
NUCLEAR THERMOELECTRIC POWER PLANT
Robert E. Magladry, Baltimore, Md., assignor to
Teledyne, Inc., Los Angeles, Calif.
Filed Nov. 18, 1965, Ser. No. 508,451
Int. Cl. G21h 1/10
U.S. Cl. 136—202                      12 Claims

ABSTRACT OF THE DISCLOSURE

The employment of a low pressure vaporizable liquid such as tetraphosphorus trisulfide within the primary loop of a nuclear powered thermoelectric converter to prevent high intensity radiation reaching the thermoelectric conversion unit.

---

This invention relates to a nuclear reactor thermoelectric power plant, and more particularly to such a power plant employing novel heat transfer means acting as reactor coolant which is completely compatible with both the nuclear reactor and the thermoelectric conversion means.

The susceptibility of thermoelectric materials to radiation damage and the practical requirement for fissionable fuel to be in a compact array has, in the past, precluded assemblies other than physically separate entities for the two basic components. In conventional prior art systems, with the thermoelectric generator and the nuclear reactor physically separate, means must be provided for transferring the heat produced by the fissionable fuel in the reactor itself to the thermoelectric material within the thermoelectric generator subassembly.

Thermal energy may be readily transferred through the use of a boiling-condensing fluid. The fluid boils within the evaporator section of a closed loop and absorbs heat according to its latent heat capacity. The vapor phase rises and flows through suitable conduit means to a condenser where it releases heat again according to its latent heat capacity. The now liquid phase falls as a result of gravity through a second conduit returning to heat input means at the evaporator section in a continuous process. The advantages of this type of heat transfer are:

(1) It is essentially isothermal; that is, the elements adjacent the evaporator and condenser section operate at the highest practical surface temperatures.

(2) Heat transfer fluid circulates naturally according to gravity, with the requirement that the condensing section be positioned above the operator section and that there be a density difference between the liquid and vapor phases, eliminating the need for moving parts to maintain circulation of the heat transfer media.

(3) The heat transmission coefficient between the metal wall and a condensing or boiling media is very high compared with the heat rate at surfaces in contact with transfer liquids without phase transformation.

It is, therefore, a primary object of this invention to provide an improved nuclear reactor thermoelectric conversion system which employs an essentially isothermal boiling-condensing process to effect maximum heat transfer efficiency between the reactor and the thermoelectric conversion means.

It is a further object of this invention to provide an improved nuclear thermoelectric power plant of this type in which the reactor coolant forms the condensing fluid for the thermoelectric hot shoes.

It is a further object of this invention to provide an improved nuclear thermoelectric power plant of this type in which the heat transfer medium, that is, the reactor coolant, is physically and chemically unaffected by the reactor radiation field and which, in the event of release to the atmosphere, will not present excessive chemical or radiological hazard.

It is a further object of this invention to provide an improved nuclear thermoelectric power plant of this type in which the radioactivity acquired by passing the coolant through the reactor is minimized to prevent damage to the thermoelectric material of the conversion means.

It is a further object of this invention to provide an improved nuclear thermoelectric power plant of this type employing a reactor coolant as the boiling-condensing fluid which has suitable circulation properties, density, viscosity and adequate latent heat capacity at low pressure, and which does not compromise reactor design.

It is a further object of this invention to provide an improved nuclear thermoelectric power plant of this type in which the common boiling and condensing fluid and reactor coolant is non-pyrophoric and solid at ambient, is a nonelectrical conductor and that if inflammable, may be readily extinguished by water.

The foregoing and other objects, features and advantages of this invention will be apparent from the following more particular description of a preferred embodiment of the invention, as illustrated in the accompanying drawing.

In the drawing:

The single figure is a schematic view of the improved nuclear thermoelectric power plant of the present invention employing a closed loop, isothermal boiling-condensing medium means between the reactor and the thermoelectric conversion means, and further employing a second isothermal boiling-condensing medium as the heat transfer means between the conversion means and a heat rejecter.

In general, the improved power plant of the present invention comprises a hermetically sealed, unidirectional heat transfer loop including spaced boiling and condensing means. The hot junction of the thermoelectric couple is in heat-receiving contact with the condenser means. A conventional liquid cooled nuclear reactor is coupled within the heat transfer loop wherein the reactor coolant circulating within the reactor forms the boiling means to transfer heat isothermally to the condensing means adjacent the thermoelectric conversion means.

A second hermetically sealed, unidirectional heat transfer loop may be provided on the cold side of the thermoelectric conversion means which includes boiling means operatively coupled to the thermoelectric conversion means and condensing means spaced therefrom for rejecting waste heat in an identical isothermal process.

Referring to the drawing, there is shown schematically the two primary components of a basic nuclear thermoelectric power plant, a conventional nuclear reactor 10 and thermoelectric conversion means, indicated generally at 12, which form portions of a hermetically sealed, unidirectional heat transfer loop 14 for effectively transferring the thermal energy released by the fissionable fuel within the reactor to the converter.

The nuclear reactor 10 is of conventional construction, other than the coolant liquid, with the fuel, for instance, comprising any one of a number of hydride zirconium-alloys and the reactor including conventional cladding for the fuel which may be formed of zirconium alloy. The inner walls of the reactor vessels may also be formed of a zirconium alloy. Further, all pumbing associated with the reactor is, likewise, of a conventional nature being formed preferably of zirconium alloy.

In incorporating the boiling-condensing medium as a means for effecting maximum efficiency thermal energy transfer from the reactor 10 to the conversion means 12 in an isothermal manner, the fluid which performs a moderating function in the conventional reactor 10 is replaced by a nonmoderating liquid. The coolant forms the volatile liquid to provide isothermal heat transfer within a hermetically sealed heat transfer loop 14 between the reactor 10 and the conversion means 12. In using the coolant as the heat transfer means, the boiling process does not at all affect the stability of the reactor process and reaction control is provided otherwise, such as by the completely passive hydride control system set forth in my copending application Ser. No. 374,656, filed June 12, 1964, which is now abandoned, entitled "Hydrogen-Diffusion Reactor Control."

Since the volatile liquid circulated through the heat transfer loop 14 passes through the reactor 10 as a liquid within the reactor vessel adjacent the fuel, it acquires some radioactivity which is carried within the closed heat transfer loop through the thermoelectric conversion means 12. For a power plant of limited capacity, the closed loop 14 may comprise a pipe 16 of zirconium alloy, three inches in diameter, between reactor 10 and conversion means 12 in a direction of flow to carry the vapor phase. A one-inch, down pipe 18 of the same material carries the condensed liquid from the conversion means back to the reactor 10. Pipe 16 is covered with a one-inch thickness insulator 20 formed of diatomaceous earth to minimize heat loss from the circulating volatile fluid. Likewise, pipe 18 includes such as outer covering 22 in the order of one-inch thickness. Heat transfer to and from the fluid 26 occurs through change in phase. Heat is absorbed by the primary fluid 26 as it boils in reactor 10 and heat is released by the primary fluid 26 as it condenses on the hot surface of heat transfer fins 25 carried by the thermoelectric elements of thermoelectric generator assembly 28 within condenser section 24. In the primary loop 14, the thermoelectric generator or conversion means 12 is located physically above reactor 10 by a distance indicated by arrow 30. The relative densities of the two phases provide sufficient gravitational heat to produce natural circulation of the fluids within loop 14. Since phase change is an isothermal process, the hot junction surfaces of the thermoelectric elements within assembly 28 are all at essentially the same temperature; that is, the condensing temperature of the primary fluid 26 which is the same as the boiling temperature of the fluid within reactor 10. Conventional reactor systems employ coolants of the alkali metal type, such as sodium, potassium and lithium compounds, these conventional alkali metal coolants are completely unsuited for the instant application, since the alkali metals absorb neutrons and the new isotopes which are circulated by the liquid coolant as they decay, radiate alpha, gamma and beta particles which are highly detrimental to the thermoelectric material and would have the effect of slowly destroying the usefulness of the power plant.

The conventional alkali metals that are used as a coolant would further be highly detrimental to the thermoelectric conversion means if the fluid path adjacent the thermoelectric elements develop leaks, since the metal being a good conductor would tend to short out the electrical generator subassembly. Also, if an alkali metal coolant were employed, any contact with water, which advantageously forms the secondary loop coolant to dissipate the waste thermal energy, would result in the generation of hydrogen with the resultant possibility of explosion, especially in a confined environment.

Further, any attempt to use organic coolants within the unidirectional heat transfer loop results in polymerization and decomposing of the organic coolant passing through the reactor. Since the isothermal process provides excellent thermal energy transfer efficiency, the phase change temperature of the volatile liquid circulated in the primary loop should correspond to the desired hot surface temperature of the thermoelectric elements used within the thermoelectric converter subassembly 28 as well as the mean temperature of reactor coolant passages. A principal feature of the present invention is the use of tetraphosphorus trisulfide ($P_4S_3$) as the heat transfer medium forming the volatile liquid carried by the primary loop. This particular coolant can operate over a wide range of pressure and temperature in the described system. However, it is uniquely well suited for operation with lead telluride thermoelectric elements, which have been extensively utilized in direct conversion devices, in this novel type of reactor system. A hot shoe temperature on the order of 950° F. provides for efficient operation of lead telluride elements. Similarly, 950° F. is a very desirable operating temperature for the coolant as it leaves the reactor 10. With this operating, or phase change, temperature, the pressure within the primary loop is at a suitably low level, on the order of 59 p.s.i.a. To circulate properly, the density and viscosity of this material are particularly favorable having its liquid density at 90.5 lb./ft.$^3$, its vapor density at 0.904 lb./ft.$^3$, and a viscosity at $2.5 \times 10^{-5}$ lb. sec. ft.$^2$. The latent heat for phase change of this material is favorable for the transfer of heat being 94.4 B.t.u./lb. Further, tetraphosphorus trisulfide is thermodynamically the most stable compound of phosphorus and sulfur. It does not polymerize. Free phosphorus and sulfur formed by radiation of the material readily recombine to form the original compound, tetraphosphorus trisulfide. It is highly compatible with the reactor structural material, including the conduits 16 and 18, since its rate of corrosion of zirconium alloy is less than 0.001 inch per year.

The thermoelectric generator is susceptible to deterioration as a result of radiation. The principal activation products of tetraphosphorus trisulfide are beta-particle emitters. These particles when slowed by structural materials yield soft gamma radiation which does not significantly affect thermoelectric materials. Its cross-section for interaction with neutrons is approximately 0.1 barn, a negligible value in a well modulated reactor. Thus, its circulatory movement through the closed loop would provide minimum reaction with the nuclear fission process and, therefore, would not compromise reactor design. As a result of physical damage to the power plant, the possibility of accidental release of the fluid to the atmosphere would not present excessive chemical or radiological hazards. For instance, a typical power plant of this type designed for a power output of 100 kw. would require approximately 50 pounds of $P_4S_3$ coolant and safety studies indicate that the accidental release of this entire amount of coolant would not represent a significant hazard 10 feet from the site. The material is non-pyrophoric below 212° F. and does not melt until 370° F. In case of leakage between condenser section 24 and the thermoelectric conversion assembly 28, no electrical shorting of the converter results, since the $P_4S_3$ material is a superior electrical insulator having a resistivity of $10^8$ ohm centimeters. Further, water is an accepted extinguisher further influencing its acceptance as a suitable closed loop heat transfer means in the instant application.

The second major component of the nuclear thermoelectric power plant resides in the thermoelectric conversion means 12, which includes a thermoelectric converter assembly 28 sandwiched between the first condensing means 24 for primary loop 14 and evaporating means 32 for a secondary hermetically sealed unidirectional heat transfer loop 34. Although not necessarily required, the second isothermal heat transfer loop may acts as a means for dissipating the waste heat and also as a means for controlling the power output of the thermoelectric conversion means. The thermoelectric generator assembly 28 converts the thermal energy into electrical form under conventional thermoelectric generator principles. It essentially involves employment of a plurality of couples having a pair of thermoelectric elements of dissimilar characteristics coupled electrically and thermally by hot thermal junction means. With a thermal gradient provided across the thermoelectric elements, potential difference is provided between the free ends of the thermal elements with the potential difference or voltage being suitably connected electrically across an exterior load. The thermoelectric conversion assembly 28 does not, in itself, form a part of the present invention and any generator assembly may be used in which the thermal elements are compatible to the temperatures involved in conjunction with a nuclear reactor power source. Various tellurium alloys may be readily used in forming the thermoelectric elements and are uniquely well suited for use with a tetraphosphorus trisulfide coolant. The electrical lead, indicated by dotted line 36, delivers the electrical energy from the thermoelectric conversion means 28 to a load (not shown) in direct current form, as generated, or alternatively, may be series coupled to an electrical inverter 38 for transforming the direct current into alternating current.

While the system will operate without the application of a secondary loop, the addition of closed loop 34 provides the desired thermal gradient across the electrical conversion means 12. It is proposed to use a boiling-condensing liquid 40 that may comprise water which boils at atmospheric pressure within boiling means 32 at 212° F. and condenses within condensing means 42 at the same temperature. Heat is given off to the boiling-condensing liquid by fins 27 coupled to the cold side of thermoelectric assembly 28. The closed loop 34 in this case consists merely of a suitable pipe 44 for circulating both the vapor phase and liquid phase in the continuous closed loop path 34. The condenser means 42 may include multiple fin heat transfer members (not shown) and may be further provided with a fan 48, whose speed or blade pitch may be controlled to vary the energy conversion rate of the converter 28 in response to electrical load change. In this respect, an electrical load sensing means 50, such as a wattmeter, may be coupled electrically as indicated by dotted line 52 to the fan for controlling the fan directly in response to changing electrical load.

While the embodiment shown in the drawing utilizes a water coolant secondary loop 34, in more simplified arrangements, the secondary coolant loop is eliminated with the fins 27 of the thermoelectric generator assembly 28 being open to the atmosphere for cooling by radiation. Alternatively, fan means may be utilized to blow cooling air across the cold side of the thermoelectric elements, specifically onto the multiple fins indicated at 27. In such an arrangement, the wattmeter 50 may again control conversion output by modifying fan speed, for instance. Heat transfer may also be advantageously accomplished with the identical open type cooling means wherein the entire device is immersed in the ocean, and the cooling fins 27 are exposed to the ocean currents.

Both the primary loop 14 and the secondary loop 34 provide isothermal heat transfer between respective boiling and condensing sections of the loop. The fluids, such as tetraphosphorus trisulfide 26, in primary loop 14 and water 40 in secondary loop 34 have been selected since their phase change temperatures correspond to desired hot and cold surface temperatures of the thermoelectric element to maintain a nonvarying thermal gradient across the thermoelectric conversion assembly 28. The vertical separation of reactor 10, thermoelectric conversion means 12, including evaporator section 24 for the primary loop 14 and boiling section 32 of secondary loop 34, are set at specific elevations indicated by arrow 30 for the primary loop components and arrow 54 for the secondary loop components to produce the necessary heat transport rates to and from the respective thermoelectric element surfaces.

Means, indicated by dotted line 54, may further be provided for controlling the rate of nuclear reaction within reactor 10 as a result of load change sensed by sensor 50, whereupon as the load increases, the reaction rate with reactor 10 is increased to increase the supply of thermal energy available to the converter. The passive control means referred to previously may advantageously be employed to achieve this end.

It is, therefore, readily apparent that the improved nuclear thermoelectric power plant of the present invention provides a completely passive generator system employing a primary hermetically sealed unidirectional heat transfer loop between the reactor and the thermoelectric generator conversion means in which the heat pump boiling and condensing fluid of tetraphosphorus trisulfide is relatively inert to the nuclear radiation within the reactor, has mild activation products and which at low pressures undergoes phase change at a temperature suitable for the hot surface of conventional tellurium alloy thermoelectric elements. Further, the tetraphosphorus trisulfide is physically and chemically compatible with the reactor components, including the primary loop conduit. In using a secondary loop as a waste heat dissipating means, the same hermetically sealed closed heat transfer loop is provided involving an isothermal boiling-condensing fluid, preferably water at ambient pressure, which undergoes a phase change at a temperature suitable for the cold surface of the tellurium alloy thermoelectric element and in which both fluids being practically nonconductors will not short out the thermoelectric conversion means should leaks develop within the primary and secondary closed loop heat transfer loops.

While there have been shown and described with reference to a preferred embodiment thereof, it will be understood by those skilled in the art that various changes in form and details may be made therein without departing from the spirit and scope of the invention.

What is claimed is:

1. An improved nuclear thermoelectric power plant comprising: a fluid cooled nuclear reactor, a hermetically sealed, unidirectional, closed heat transfer loop, means for fluid coupling said reactor within said closed loop, thermoelectric conversion means including condensing means in heat transfer relationship therewith, means for fluid coupling said condensing means within said loop above said reactor, a low pressure vaporizable liquid carried within said loop, said liquid being tetraphosphorus trisulfide which is chemically and physically compatible with said reactor material but incapable of carrying high intensity radiation to said thermoelectric conversion means whereby said vaporizable liquid acts as the reactor coolant and as the boiling-condensing fluid within said heat transfer loop to isothermally conduct heat between said nuclear reactor and said thermoelectric conversion means.

2. The power plant as claimed in claim 1 wherein said low pressure vaporizable liquid tetraphosphorus trisulfide is at a pressure of approximately 59 p.s.i.a.

3. The power plant as claimed in claim 1 wherein said vaporizable liquid carried within said loop is fluid-confined by a zirconium alloy material.

4. The power plant as claimed in claim 1 further including zirconium alloy pipes coupling said nuclear reactor and said condensing means to form said hermetically sealed unidirectional closed heat transfer loop.

5. The power plant as claimed in claim 4 further including a layer of diatomaceous earth surrounding said pipe.

6. The improved power plant as claimed in claim 1 further including means for sensing the electrical power output of said thermoelectric conversion means, waste heat dissipating means thermally coupled to said thermoelectric generator and means responsive to the power output of said conversion means for varying the thermal energy released by said waste heat dissipating means.

7. The power plant as claimed in claim 6 wherein said waste heat dissipating means includes a plurality of heat conducting fins, a cooling fan in juxtaposition to said fin, and means responsive to said sensing means for varying the rate volume of cooling fluid directed onto said fins by said cooling fan.

8. The power plant as claimed in claim 1 further including means for sensing the electrical power output of said thermoelectric conversion means and nuclear reactor control means coupled to said electrical sensing means and responsive thereto for regulating the nuclear reaction in response to the electrical power output.

9. An improved nuclear thermoelectric power plant comprising: a fluid cooled reactor, primary and secondary hermetically sealed, unidirectional heat transfer loops including spaced, first and second boiler and condenser means respectively, thermoelectric conversion means in heat transfer relationship with said first condensing means, said first boiling means carried by said nuclear reactor, means coupling said first condensing means and said second boiling means on opposite sides of said thermoelectric conversion means and in heat transfer relationship therewith, said first condensing means spaced above said first boiling means and said second condensing means spaced above said second boiling means, low pressure, vaporizable liquids carried within respective primary and secondary loops with said first vaporizable liquid being tetraphosphorus trisulfide which is chemically and physically compatible with said reactor materials but incapable of carrying high intensity radiation to said thermoelectric conversion means whereby heat is isothermally transferred between said nuclear reactor and said thermoelectric conversion means and between said thermoelectric conversion means and said heat dissipating means.

10. The power plant as claimed in claim 9 further including waste heat dissipating means thermally coupled to said second condensing means.

11. The power plant as claimed in claim 10 wherein said waste heat dissipating means includes conductive heat rejecting surfaces and further including; means for sensing the electrical power output of said thermoelectric conversion means, and means for varying the flow of cooling air toward said surfaces in response to the power output sensed by said electrical power output sensing means.

12. The thermoelectric power plant that as claimed in claim 9 wherein said primary loop liquid comprises tetraphosphorus trisulfide at a pressure of approximately 59 p.s.i.a., fluid confined by a zirconium alloy material and said secondary liquid comprises water at a pressure of 14.7 p.s.i.a.

References Cited

UNITED STATES PATENTS

| | | | |
|---|---|---|---|
| 527,378 | 10/1894 | Severy | 136—212 |
| 2,966,033 | 12/1960 | Hughel | 136—205X |
| 3,277,827 | 10/1966 | Roes | 136—205X |
| 3,324,667 | 6/1967 | Muller | 136—204X |

OTHER REFERENCES

Sawle, Sulfur-cooled Power Reactor Study, Chem. Abstracts, vol. 55, p. 24285(g), 1961.

WINSTON A. DOUGLAS, Primary Examiner

D. L. WALTON, Assistant Examiner

U.S. Cl. X.R.

176—39